United States Patent Office 3,230,705
Patented Jan. 25, 1966

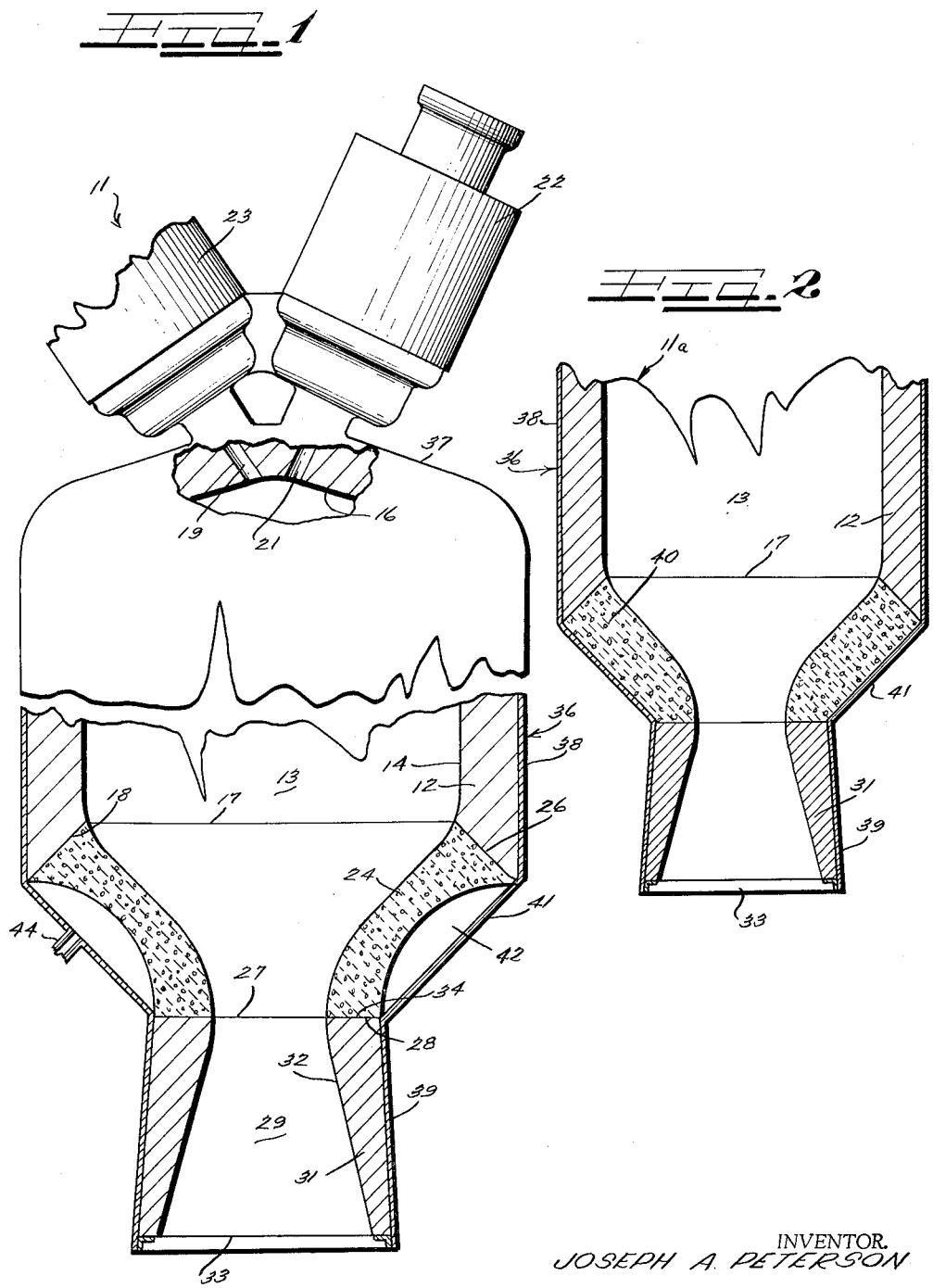

3,230,705
CHEMICALLY COOLED ROCKET
Joseph A. Peterson, Long Beach, Calif., assignor to TRW Inc., a corporation of Ohio
Filed July 11, 1962, Ser. No. 209,020
16 Claims. (Cl. 60—35.6)

This invention generally relates to cooled rocket motors and more particularly relates to chemically cooled rocket motors.

The nozzle throat area of a combustion gas propelled rocket motor is subjected to high temperatures and pressures from the exiting combustion gases, and, unless protected, will deteriorate to cause the motor to lose its optimum thrust.

Rocket motors and their nozzle throat areas have been somewhat protected by regenerative cooling—i.e. by circulating the cool fuel through the nozzle wall; by sweat cooling—i.e. by having the fuel, water, or other vaporizable material bleed through the wall of the nozzle whereupon the hot combustion gases vaporize the vaporizable material and thereby absorb heat; and by ablative cooling—i.e. by burning away an ablative liner on the nozzle wall and forming an insulating gas layer.

These prior known protection methods are quite inadequate because, for example, regenerative or sweat cooling methods are slow, wasteful and only have a low heat absorption capacity while ablative cooling destroys the nozzle contour and requires heavy liners.

It is therefore an object of the present invention to provide a lightweight efficient cooling system for a rocket nozzle which maintains the structural integrity of the rocket nozzle.

It is another object of the present invention to provide a rocket nozzle which is cooled instantaneously.

It is still further another object of the present invention to provide a rocket motor which is cooled by endothermic chemically reacting materials in the nozzle area.

It is still another another object of the present invention to provide a hypergolic gas propelled rocket motor with a porous reactor tube in the nozzle throat area which is cooled with endothermic reacting chemicals having products of decomposition effective to form a gaseous boundary layer in the throat to protect the throat structure from excessive attack by the hot exiting gases.

It is still another object of the present invention to provide a rocket motor with a reactor inner liner which is cooled by endothermic reacting chemicals, which forms a protective boundary gas layer of the reacted chemicals and which diffuses the gases into the thrust gas of the motor and add to the thrust drive.

Other and further objects of this invention will be apparent to those skilled in the art from the following detailed description and the annexed sheet of drawings in which like reference characters refer to like parts in the several figures.

On the drawings:

FIGURE 1 is a broken elevational view of a rocket engine of the present invention with parts in cross-section; and FIGURE 2 is a partial cross-section of a rocket nozzle illustrating another embodiment of the present invention.

As shown on the drawings:

Referring to FIGURE 1, the rocket motor 11 of the present invention has a combustion chamber housing 12 made of a molded ablative plastic material such as silica fiber fluff impregnated with phenolic resin, an insulative ceramic such as Rockide, or any other suitable combustion chamber lining material. The housing 12 defines an inverted cup-shaped combustion chamber 13 with a cylindrical side wall 14 and a conical or convergingly tapered end feed wall 16. The plastic housing 12 is of a uniform thickness and defines an exit open circular end 17 opposite the feed end 16. The end surface 18 of the housing 12 has a frusto-conical taper with the frusto-apex portion forming the exit open end 17.

The feed end wall 16 defines an oxidizer delivery passageway 19 and a fuel delivery passageway 21. Fuel such as hydrazine or hydrazine mixtures and oxidizer such as $N_2O_4$ or red fuming nitric acid are delivered to the fuel and oxidizer delivery passageways by solenoid valve operated fuel injector 22 and solenoid valve operated oxidizer injector 23 respectively. Both injectors are mounted on the rocket motor body feed end 16 and separated from the rocket body by mounting means to provide a heat barrier or dam between the rocket motor body and the solenoid operated valve injectors. Each injector has an "on-off" valve operation and the oxidizer and fuel passageways are sized and bored at an angle so as to deliver the correct amount of fuel and oxidizer for impingement in the combustion chamber to effect a complete hypergolic reaction between the fuel and oxidizer and form the thrust gases for propelling the motor.

The nozzle of the rocket motor of the present invention is a De Laval type nozzle with a tubular catalytic liner converging portion 24. The tubular portion 24 has a tapered end 26 for interfitting with and being bonded to the combustion chamber end 18. The tube 24 converges to form a nozzle throat 27 and has a nozzle throat end 28.

The nozzle portion 24 is a porous refractory tube formed of a molded ceramic or refractory metal impregnated with a dehydrogenation or isomerization catalyst. The tube must be capable of withstanding a severe thermal and erosion environment and the catalyst must be stable and effective in the environment. The tube 24 is preferably formed from heterogeneous mixture of silica and alumina as a carrier for a catalyst such as platinum, rhodium, rubidium, and indium. The refractory powders are molded or slush cast to tube shape and impregnated with a salt of the catalyst and fired to reduce the salt and to harden the tube. The preferred tubular catalytic liner 24 is composed of about 75% silica and 25% alumina, as silica is more porous than alumina. Suitable catalyst salts include the halides of the catalyst metals such as $PtCl_3$. Alternately the catalyst salts can be made in gel form and centrifuged into the pores of the molded tube.

A diverging exhaust nozzle portion 29 is defined by a cylindrical molded plastic exhaust nozzle tube 31 having a tapered inner side wall 32 diverging to form an exit opening 33 larger than the nozzle throat 27. The exhaust tube 31 has a flat circular entrance end 34 that interfits with the catalytic nozzle tube liner end 28 and is bonded thereto.

A casing 36 envelopes the motor 11 and has a conical end 37 encompassing the feed end 16; a cylindrical side 38 encompassing and bonded to the cylindrical portion of the combustion chamber wall 12; a cylindrical portion 39 encompassing and bonded to the exhaust nozzle tube 31; and a frusto-conical or tapered wall 41 converging from the cylindrical side 38 to the cylindrical portion 39. The casing is preferably made of stainless steel or wound filament having refractory properties.

The catalytic liner 24 and the converging wall 41 of the casing define therebetween an annular chamber 42. The chamber 42 is filled with endothermic chemicals that seep into the porous catalytic liner 24. The heat generated by the combustion gases causes the endothermic chemical to react and decompose or isomerize. Thus, heat is transferred from the combustion gases to the reacting chemicals and this heat absorption maintains the walls of the rocket motor in a relatively constant cool condition.

The chamber 32 is charged through a feed conduit 44 communicating a chemical feed tank (not shown) therewith. The chemical charge is preferably an endothermic decomposing saturated naphthenic hydrocarbon material such as methylcyclopentane, cyclohexane, methylcyclohexane, and dimethylcyclohexane or a material which absorbs heat when changed isomerically as for example when iso-butane is converted to n-butane. These endothermic materials when dehydrogenated absorb large quantities of heat and react to become unsaturated hydrocarbons and release cooled hydrogen gas in profused quantities. The released gas and the hydrocarbon vapors bleed through the pores of the tube and form a boundary layer of gas along the inner surface of the tube which insulates the tube from the exiting thrust gases of combustion. The inner skin of this boundary layer diffuses into the exiting gases and is burned to form additional exiting thrust gases.

In order to prevent leakage of the endothermic chemicals from the chamber through the porous catalytic liner 24, before the rocket is fired, the catalytic liner may be coated with an epoxy resin. The epoxy resin is then burned off during the operation of the rocket. Alternately, the endothermic chemicals can be made into the form of a gel which will not flow until heated.

FIGURE 2 illustrates another embodiment of the present invention wherein a rocket motor 11a of similar construction to the motor 11 differs therefrom in the reactor tube 40 defining the throat area and the elimination of the chamber 42.

The catalytic liner tube 40 is composed of the same porous refractory ceramic or metal and impregnated with the same catalysts as the catalytic liner 24. However, the porous catalytic liner 40 has suspended therein a thixotropic gel of the endothermic reactive saturated naphthenic hydrocarbon.

In operation the rocket motor 11 or 11a of this invention is activated by opening the solenoid injectors to release fuel and oxidizer into the combustion chamber 13 where the hypergolic reaction occurs to form the thrust gases. Oxidizer in amounts slightly in excess of that required for the hypergolic reaction is introduced to support burning of the gases released from the endothermic coolant. As the hot thrust gases from the reaction chamber 13 flow through the nozzle tube 24 or 40 the tube of course is heated thereby. The pores of the tube are charged with the endothermic coolant and when the coolant is heated sufficiently to reach its dehydrogenation or isomerization temperature an endothermic reaction will ensue. This reaction is catalyzed by the catalysts embedded in the nozzle tube. The coolant of course is first evaporated under the heat influence of the combustion gases and the vapors pass through the pores of the nozzle tube where they reach a reaction zone inside the body of the tube. At this reaction zone the endothermic heat absorption will cool the tube. The gaseous products flow from the reaction zone to the inside of the tube where they form a boundary layer of gases protecting the wall of the tube against erosion from the hot combustion gases. The inner skin of this boundary layer of gases is then burned by the excess oxidizer in the combustion gases to form additional thrust gases for augmenting the propelling force of the main combustion gas stream.

When saturated naphthenic hydrocarbons are used as the coolant, the reaction zone inside the body of the nozzle tube is maintained at temperatures around 800° F. which is the dehydrogenation temperature of the hydrocarbon. When cyclohexane is used as the saturated naphthenic hydrocarbon about 49,000 calories are absorbed for each gram mole of benzene ring that is formed and the following reaction will occur:

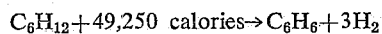

The heat absorption by this reaction will maintain a reaction zone within the tube body at temperatures of about 800° F. thereby preserving the structure and shape of the tube.

The gaseous hydrocarbon and hydrogen released from the endothermic reaction zone create a blowing effect on the gaseous boundary layer inside the nozzle tube and this blowing effect decreases the heat transfer of the combustion gases to the tube. It has been found that a heat transfer rate of 30,000 B.t.u.'s per hour per square foot can be reduced to 20,000 B.t.u.'s per hour per square foot by the blowing effect alone. In addition the gases leading into the interior of the tube tend to thicken the boundary layer of the combustion gases lining the tube and the thickened layer decreases the heat transfer rate.

The thickened boundary layer may continue downstream from the tube to protect the exhaust nozzle portion 31 of the motor.

It will of course be appreciated that heat from the combustion gases is conducted through the nozzle tube to vaporize the coolant in the chamber 42 or impregnated in the nozzle tube 40. Then the vaporized coolant flows through the port of the nozzle tube to the reaction zone within the tube body where the endothermic reaction occurs to absorb heat and to release the dehydrogenation products of the reaction into the boundary layer lining of the inside of the tube.

Cyclohexane is a preferred coolant because it gives the lowest molecular weight gases and has the least poisoning effect on the catalyst.

The heat transfer rate at the inner wall of the catalytic liner is approximately 30,000 B.t.u. per hour per square foot without any blowing. As was pointed out above, the blowing effect of the relatively cool decomposition products of cyclohexane reduces the heat transfer rate to 20,000 B.t.u. per hour per square foot. The zone between the inside of the boundary layer and the reaction zone reduces the heat transfer rate to the endothermic cyclohexane by another 10,000 B.t.u. per hour per square foot. Therefore heat is transferred from the hot exiting combustion gases to the endothermic cyclohexane in the catalytic liner at the rate of 10,000 B.t.u. per hour per square foot.

The cyclohexane is first heated from its storage temperature to approximately 100° F., its vaporization temperature. This requires the absorption of approximately 920 B.t.u. per hour per square foot per pound of cyclohexane. This vaporization absorption of heat is all that is used in cooling by the sweat-cooling method.

Heating the vaporized cyclohexane from 100° F., the vaporization temperature to approximately 800° F., the reaction temperature requires 300 B.t.u. per hour per square foot per pound of cyclohexane. Therefore to raise one pound of cyclohexane from the storage temperature to the reaction temperature requires 1,220 B.t.u. per hour per square foot.

The benzene and hydrogen gas (Cp ca. 0.5) formed by reacting one pound of cyclohexane initially absorbs 1,058 B.t.u. per hour per square foot in the reaction itself. To heat the formed benzene hydrogen gas from 800° F. to 2800° F., the temperature at the inner surface of the catalytic liner, requires approximately 1,000 B.t.u. per hour per square foot per reacting pound of cyclohexane. Therefore, the reaction of one pound of cyclohexane in the catalytic liner of the present invention requires (1,220 B.t.u.+1,058 B.t.u.+1,000 B.t.u.) approximately 3,280 B.t.u. per hour per square foot.

Therefore, to absorb the 10,000 B.t.u. per hour per square foot that is conveyed to the cyclohexane reaction zone by the hot combustion gases requires the reaction of approximately 3 pounds of cyclohexane per hour per square foot of area. This is not a large quantity of coolant if it is realized that this coolant with enough oxidizer to burn the decomposition products in the combustion zone will yield a specific impulse of about 290 seconds for a nozzle expansion ratio of about 15.

From the above it will be understood that this invention provides a reactor in the throat area of a rocket motor which is charged with endothermic coolants that will be decomposed or changed either by dehydrogenation or isomerization reactions promoted by suitable catalysts to absorb heat and produce gaseous products capable of augmenting the thrust gases of the air motor while decreasing the heat transfer of the main combustion gases to the throat member and thereby maintain the structural shape and efficient nozzle contour for the motor.

I claim as my invention:

1. In a rocket motor having a combustion chamber and a discharge nozzle, the improvement of
    a porous refractory liner tube in said motor receiving thrust gases therethrough,
    a dehydrogenation catalyst impregnated throughout said liner, and
    means for feeding endothermic reactive materials from one side to the other side of the liner through the pores of the liner for decomposition by said catalyst within said liner.

2. A rocket motor having a combustion chamber and a nozzle portion comprising:
    a porous liner lining and forming at least a portion of the inside walls of said rocket motor,
    an endothermic reactive hydrocarbon impregnated throughout said liner,
    said hydrocarbon being reactive within said liner with the heat of hot combustion gases in the combustion chamber to cool the walls of the rocket motor.

3. A rocket motor having a combustion chamber and a nozzle portion comprising:
    a porous catalytic liner lining and forming at least a portion of the inside walls of said rocket motor,
    said liner having a cataylst absorbed throughout,
    an endothermic reactive hydrocarbon impregnated throughout said liner,
    said hydrocarbon being reactive within said liner with the heat of hot combustion gases in the combustion chamber to cool the walls of the rocket motor.

4. A rocket motor having a combustion chamber and a nozzle portion comprising:
    a porous catalytic liner lining and forming at least a portion of the inside walls of said rocket motor,
    said liner having a dehydrogenation catalyst absorbed throughout,
    an endothermic reactive saturated naphthenic hydrocarbon impregnated throughout said liner, and
    said hydrocarbon being reactive within said liner with the heat of hot combustion gases in the combustion chamber to cool the walls of the rocket motor.

5. A rocket motor having a combustion chamber and a nozzle portion comprising:
    a porous catalytic liner lining and forming at least a portion of the inside walls of said rocket motor,
    said liner having absorbed throughout an isomerization catalyst,
    an endothermic reactive saturated hydrocarbon impregnated throughout within said liner, and
    said hydrocarbon being reactive within said liner with the heat of hot combustion gases in the combustion chamber to cool the walls of the rocket motor.

6. A rocket motor having a combustion chamber and a nozzle portion comprising:
    a porous catalytic liner lining and forming at least a portion of the inside walls of said rocket motor,
    said liner having a dehydrogenation catalyst absorbed throughout,
    an endothermic reactive saturated naphthenic hydrocarbon impregnated into said liner,
    said hydrocarbon being selected from the group consisting of methylcyclopentane, methylcyclohexane, cyclohexane, and dimethylcyclohexane, and
    said saturated hydrocarbon being reactive within said liner with the heat of hot combustion gases in the combustion chamber to expel gases through the pores of the catalytic liner to cool the walls of the rocket motor.

7. A rocket motor having a combustion chamber and a nozzle portion comprising:
    a porous catalytic liner lining and forming at least a portion of the inside walls of said rocket motor,
    said liner having a dehydrogenation catalyst absorbed throughout,
    said catalyst being selected from the group consisting of platinum, rhodium, rubidium and indium,
    an endothermic reactive saturated naphthenic hydrocarbon impregnated into said liner,
    said hydrocarbon being selected from the group consisting of methylcyclopentane, methylcyclohexane, cyclohexane, and dimethylcyclohexane, and
    said saturated hydrocarbon being reactive within the liner with the heat of hot combustion gases in the combustion chamber expel gases through the pores of the liner to cool the walls of the rocket motor.

8. A rocket motor having a combustion chamber and a nozzle portion comprising:
    a porous catalytic liner composed of a heterogeneous mixture of silica and alumina as a carrier for a self-standing catalyst,
    said liner lining and forming at least a portion of the inside walls of the rocket motor said catalyst being selected from the group consisting of platinum, rhodium, rubidium and indium,
    an endothermic reactive saturated naphthenic hydrocarbon impregnated into said liner,
    said hydrocarbon being selected from the group consisting of methylcyclopentane, methylcyclohexane, cyclohexane, and dimethylcyclohexane, and
    said saturated hydrocarbon being reactive within the liner with the heat of hot combustion gases in the combustion chamber expel gases through the pores of the liner to cool the walls of the rocket motor.

9. A rocket motor having a combustion chamber and a converging-diverging nozzle portion comprising:
    a porous catalytic liner lining and forming at least a portion of the walls of the rocket motor and being composed of a heterogeneous mixture of silica and alumina as a carrier for a self-standing platinum catalyst,
    a cyclohexane hydrocarbon impregnated into said liner, and
    said saturated hydrocarbon being reactive within the liner with the heat of hot combustion gases in the combustion chamber expel gases through the pores of the liner to cool the walls of the rocket motor.

10. A rocket motor having a combustion chamber and a converging-diverging nozzle portion comprising:
    a porous catalytic liner forming the converging wall of said rocket motor nozzle,
    said catalytic liner having a self-standing catalyst throughout said liner,
    a saturated endothermic hydrocarbon impregnated in said liner, and
    said hydrocarbon being selected from the group consisting of saturated endothermic naphthenic hydrocarbons and endothermic isomerizating hydrocarbons, whereby heat from the combustion chamber is absorbed by the endothermic reactive hydrocarbons to react the hydrocarbons within the liner and to expel reactive gases through the pores of the liner and thereby maintain a cool rocket nozzle.

11. A rocket motor having a combustion chamber and a converging-diverging nozzle portion comprising:
    a porous catalytic liner forming the converging wall and another material forming the diverging wall of said rocket motor nozzle, said catalytic liner having a self-standing catalyst throughout said liner,
a saturated endothermic hydrocarbon impregnated in said liner,
said hydrocarbon being selected from the group consisting of saturated endothermic naphthenic hydrocarbons,
and said naphthenic hydrocarbons being selected from the group consisting of methylcyclopentane, cyclohexane, methylcyclohexane and dimethylcyclohexane,
whereby heat from the combustion chamber is absorbed by the endothermic reactive hydrocarbons to react the hydrocarbons within the liner and to expel reactive gas through the pores of the liner and thereby maintain a cool rocket nozzle.

12. A rocket motor having a combustion chamber and a converging-diverging nozzle portion comprising:
a porous liner forming the converging wall of said rocket motor nozzle,
said catalytic liner having a self-standing catalyst throughout said liner,
said catalyst being selected from the group consisting of platinum, rhodium, rubidium and indium,
a saturated endothermic hydrocarbon impregnated in said liner,
said hydrocarbon being selected from the group consisting of saturated endothermic naphthenic hydrocarbons,
and said naphthenic hydrocarbons being selected from the group consisting of methylcyclopentane, cyclohexane, methylcyclohexane, and dimethylcyclohexane,
whereby heat from the combustion chamber is absorbed by the endothermic reactive hydrocarbons to react the hydrocarbons within the liner and to expel reactive gas through the pores of the liner and thereby maintain a cool rocket nozzle.

13. A rocket motor having a combustion chamber and a converging-diverging nozzle portion comprising:
an outer casing,
the inner walls of said casing being lined with a suitable lining material,
a porous catalytic liner forming the converging wall of said rocket motor nozzle,
said catalytic liner having a self-standing catalyst throughout said liner,
an annular endothermic hydrocarbon supply reservoir defined by said catalytic liner and said outer casing,
said reservoir containing endothermic hydrocarbons and supplying said hydrocarbons to said catalytic liner through the pores of said liner,
whereby heat from the combustion chamber is absorbed by the endothermic reactive hydrocarbons to react the hydrocarbons within the liner and to expel reactive gas through the pores of the liner and thereby maintain a cool rocket nozzle.

14. A rocket motor having a combustion chamber and a converging-diverging nozzle portion comprising:
a porous catalytic liner forming the converging wall of said rocket motor nozzle,
said catalytic liner having a self-standing catalyst throughout said liner,
and said liner having suspended therein a thixotropic gel of a saturated naphthenic hydrocarbon,
whereby heat from the combustion chamber is absorbed by the endothermic reactive hydrocarbons to react the hydrocarbons within the liner and to expel reactive gase through the pores of the liner and thereby maintain a cool rocket nozzle.

15. The method of cooling rocket motors which comprises:
lining at least a portion of the motor with a porous refractory liner,
flowing endothermic chemicals through the pores of the liner, maintaining an endothermic reaction of said chemicals within the body of the liner by heat of combustion thrust gases of the motor,
bleeding gaseous products of the endothermic reaction of said chemicals through the pores of the liner into the motor to provide cooling for the walls of the motor, and
burning said gaseous products in the motor and feeding the burning gases into the combustion gases exiting from the motor.

16. A method of cooling a rocket motor having a combustion chamber and a converging-diverging nozzle comprising:
igniting a fuel in the rocket motor combustion chamber,
producing hot combustion gases in said combustion chamber,
contacting the hot combustion gases with an endothermic saturated naphthenic hydrocarbon selected from the group consisting of methylcyclopentane, cyclohexane, methylcyclohexane, and dimethylcyclohexane,
reacting said endothermic hydrocarbon,
absorbing heat from said hot combustion gases and blowing hydrogen into said hot combustion gases, and
enlarging an exhaust nozzle boundary layer to protect the exhaust nozzle from the attack by the hot oxidizing combustion gases,
whereby heat from the combustion chamber is absorbed by the endothermic reactive hydrocarbons and thereby maintains a cool rocket nozzle.

References Cited by the Examiner

UNITED STATES PATENTS

| 2,841,213 | 7/1958 | De Piolenc et al. | 60—35.6 |
| 2,962,221 | 11/1960 | Kunz | 60—35.6 |
| 3,009,230 | 11/1961 | Gruber | 60—35.6 |
| 3,014,353 | 12/1961 | Scully et al. | 60—39.66 |
| 3,022,190 | 2/1962 | Feldman | 60—35.6 |
| 3,067,594 | 12/1962 | Bland et al. | 60—35.6 |
| 3,069,847 | 12/1962 | Vest | 60—35.6 |

FOREIGN PATENTS

| 1,153,115 | 9/1957 | France. |
| 1,240,638 | 8/1960 | France. |

MARK NEWMAN, *Primary Examiner.*

SAMUEL LEVINE, *Examiner.*